July 6, 1965   M. BENTELE   3,193,188
ROTOR AND SEAL CONSTRUCTION FOR ROTARY MECHANISMS
Filed April 11, 1963   4 Sheets-Sheet 1

INVENTOR.
MAX BENTELE
BY
Thomas W. Kennedy
ATTORNEY

INVENTOR.
MAX BENTELE

BY Thomas W. Kennedy
ATTORNEY

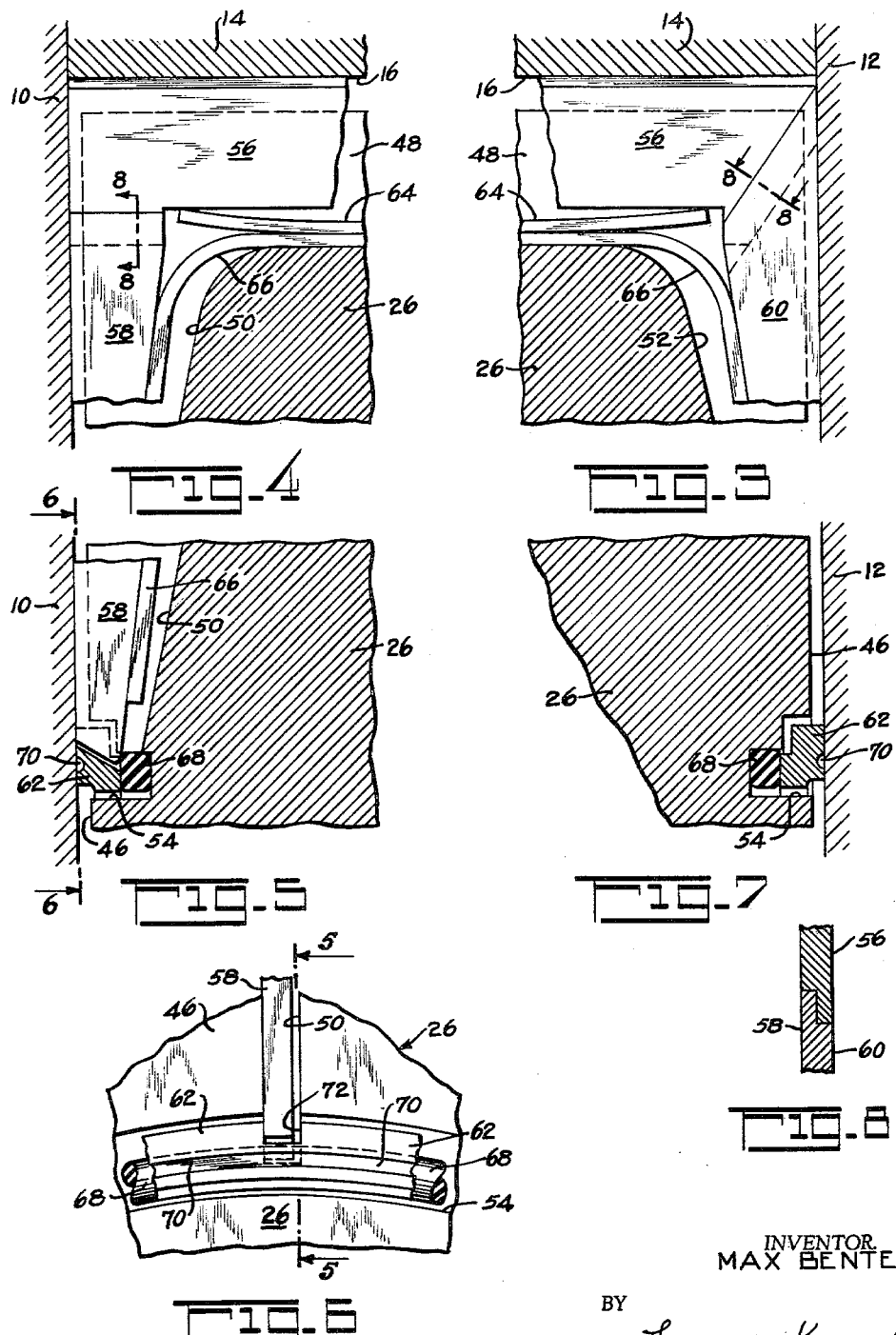

July 6, 1965 M. BENTELE 3,193,188
ROTOR AND SEAL CONSTRUCTION FOR ROTARY MECHANISMS
Filed April 11, 1963 4 Sheets-Sheet 4
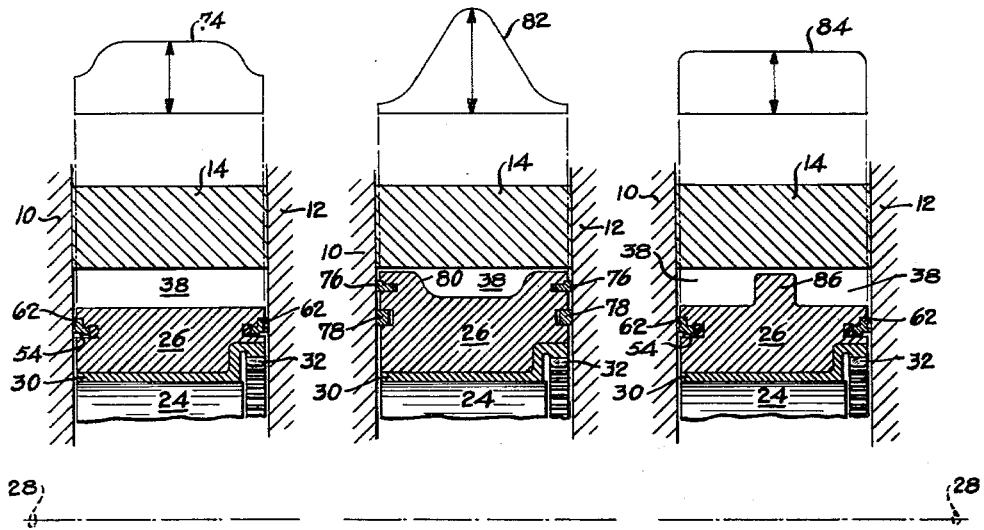
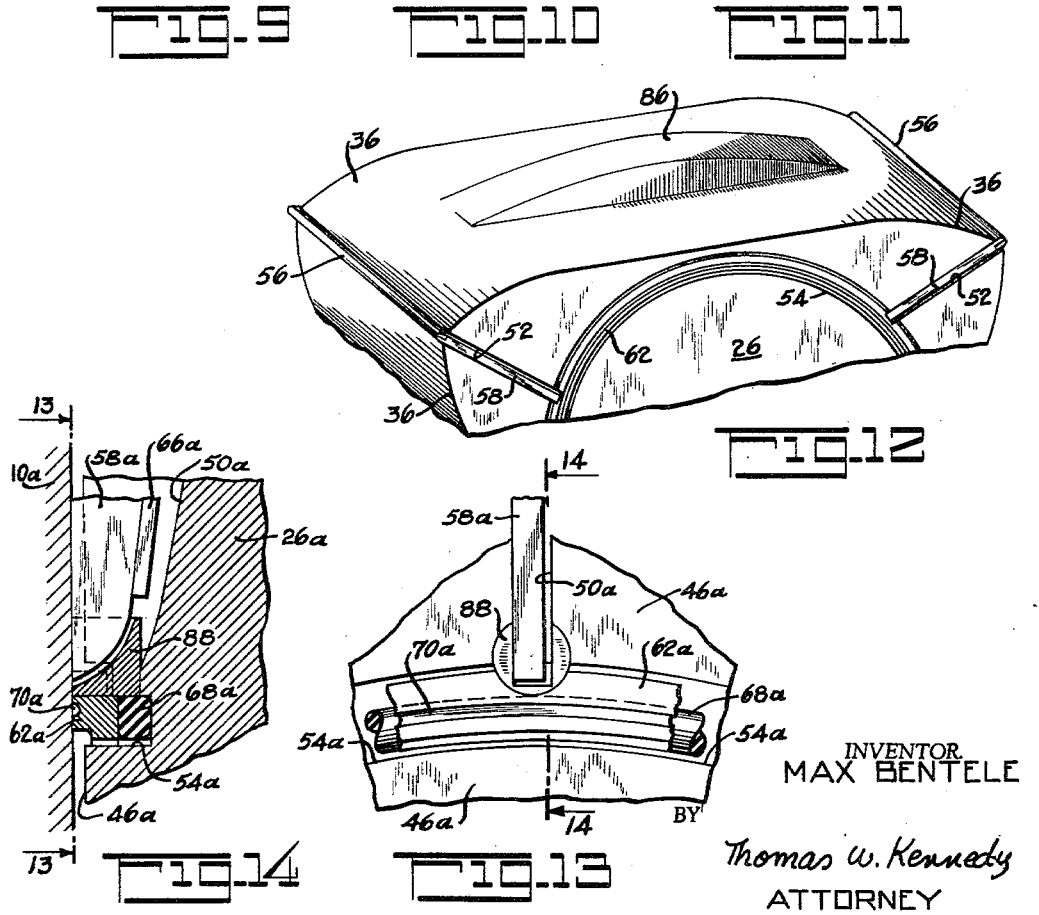
INVENTOR.
MAX BENTELE
BY
Thomas W. Kennedy
ATTORNEY

United States Patent Office 3,193,188
Patented July 6, 1965

3,193,188
ROTOR AND SEAL CONSTRUCTION FOR
ROTARY MECHANISMS
Max Bentele, Ridgewood, N.J., assignor to Curtiss-Wright Corporation, a corporation of Delaware
Filed Apr. 11, 1963, Ser. No. 272,381
9 Claims. (Cl. 230—145)

The present invention relates broadly to the art of rotary mechanisms and is particularly directed to sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is disclosed in relation to an internal combustion engine, but the invention is also suitable to other forms of rotary mechanisms such as fluid pumps and fluid motors.

A rotary engine as disclosed in said patent comprises an outer body or housing having a cavity therein and an inner body or rotor disposed therein rotatable relative to the outer body, about an axis laterally spaced from but parallel to the axis of said cavity. The inner body is journaled on an eccentric portion of a shaft which is co-axial with the outer body and journaled in bearings carried by the outer body end walls. The outer body has axially-spaced end walls and a peripheral wall interconnecting the end walls to form said cavity; the inner surface of the cavity peripheral wall having a multi-lobed profile which preferably is basically an epitrochoid.

The inner body or rotor has end faces carrying end-face seal means disposed adjacent to said outer body end walls for sealing cooperation therewith and has a peripheral surface with a plurality of circumferentially-spaced apex portions, each carrying a radially-movable seal means for sealing engagement with the multi-lobed inner surface of the outer body peripheral wall to form a plurality of working chambers between the two bodies which vary in volume upon relative rotation of the two bodies. The working chambers of the engine undergo a process of operation, which includes the four phases of intake, compression, expansion and exhaust.

The bearing between the inner body and the shaft eccentric and the shaft bearings are preferably supplied with lubricating oil under pressure. The inner body is provided with oil sealing means on each end face for oil sealing contact with their adjacent outer body end walls to control the passage of oil radially outwardly toward the working chambers between the inner body end faces and the outer body end walls.

Prior rotary combustion engines of the mentioned type have apex seal means and end face gas seal means for sealing the working chambers, and separate seal rings for preventing leakage of oil radially outwardly toward the working chambers, for example as disclosed in United States Patent Number 3,033,180.

An object of the invention comprises the provision of a rotor for a rotary combustion engine in which a novel and simple sealing arrangement is provided for gas sealing of the working chambers and to control oil leakage radially outwardly into the working chambers.

Specifically, instead of the provision of apex seal strips, intermediate seal pins and end face seal strips for gas sealing of the working chambers, plus separate adjacent, end face seal rings for oil sealing the shaft bearings, this invention provides novel apex seal strips and one-piece, circular end face seal rings, which together provide the gas sealing of the working chambers; and said end face seal rings by themselves also provide the oil seals to control oil leakage radially outwardly into the working chambers. With this construction the concentration of wear is minimized on the inner surfaces of the housing end walls as described in patent application Serial No. 239,027 filed November 20, 1962.

Another object resides in the provision of a rotor for a rotary combustion engine in which the peripheral surface of the rotor is formed to provide a more compact combustion chamber than in the prior art and so that the heat flow into the outer body peripheral wall from each working chamber undergoing combustion and expansion is more uniform across said peripheral wall than in the prior art. Rotors of the prior art have a profile with a considerable convex curvature to each working face of the rotor, with gas seals disposed in grooves in each end face of the rotor generally parallel to the curvature of the working faces and positioned near the rotor periphery, and separate oil seals disposed radially inwardly of the gas seals. With such rotors, owing to the close approach of the working faces to the cusp of the basically epitrochoidal curve of the peripheral housing, it was necessary to provide each rotor working face with a recess therein to assure transfer of gases at the top dead center position. Such rotors caused a high-temperature peak of heat rejection to the peripheral housing at a point midway of the longitudinal extent of the housing. To achieve better heat distribution it is desirable to alter the shape of the working chambers by flattening the curve of the rotor working faces, that is by cutting back a portion of the convex arc of the working face in a direction toward the rotor axis, and omitting the recess. Such straightening of the profile substantially reduces the dimensions of the end faces of the rotor, and if the same rotor bore is maintained there is no longer room for separate gas and oil seals, with the gas seals paralleling the rotor periphery and positioned near the edge. For this reason the present combined, circular, single gas and oil seal has been devised, and it is positioned as closely as practicable to the rotor bore concentrically therewith, cooperating with apex seals of new design to provide gas sealing of the working chambers and oil sealing around the rotor bearing.

Other objects of the invention will become apparent upon reading the annexed detail description in connection with the drawings in which:

FIG. 3 is an enlarged view of the portion "A" of FIG. 1;

FIG. 4 is an enlarged view of the portion "B" of FIG. 1;

FIG. 5 is an enlarged view of the portion "C" of FIG. 1;

FIG. 6 is a view as taken along line 6—6 of FIG. 5;

FIG. 7 is a sectional view as taken along line 7—7 of FIG. 2;

FIG. 8 is a sectional view as taken along line 8—8 of FIGS. 3 and 4;

FIG. 9 is a partial longitudinal, sectional view of a rotary engine embodying the invention showing a working chamber in its combustion phase and showing a schematic distribution curve of the combustion-heat rejection rate from the working chamber to the outer body peripheral wall;

FIG. 10 is a view similar to FIG. 9 except having a prior art form of rotor with its respective curve of heat rejection rate for comparison;

FIG. 11 is a view similar to FIG. 9 except having another form of rotor in accordance with the invention and with its heat curve for comparison;

FIG. 12 is a partial perspective view of the same form of rotor as is illustrated in FIG. 11;

FIG. 13 is a view similar to FIG. 6 and showing another embodiment of the invention; and FIG. 14 is a sectional view as taken along line 14—14 of FIG. 13.

Figure 1:
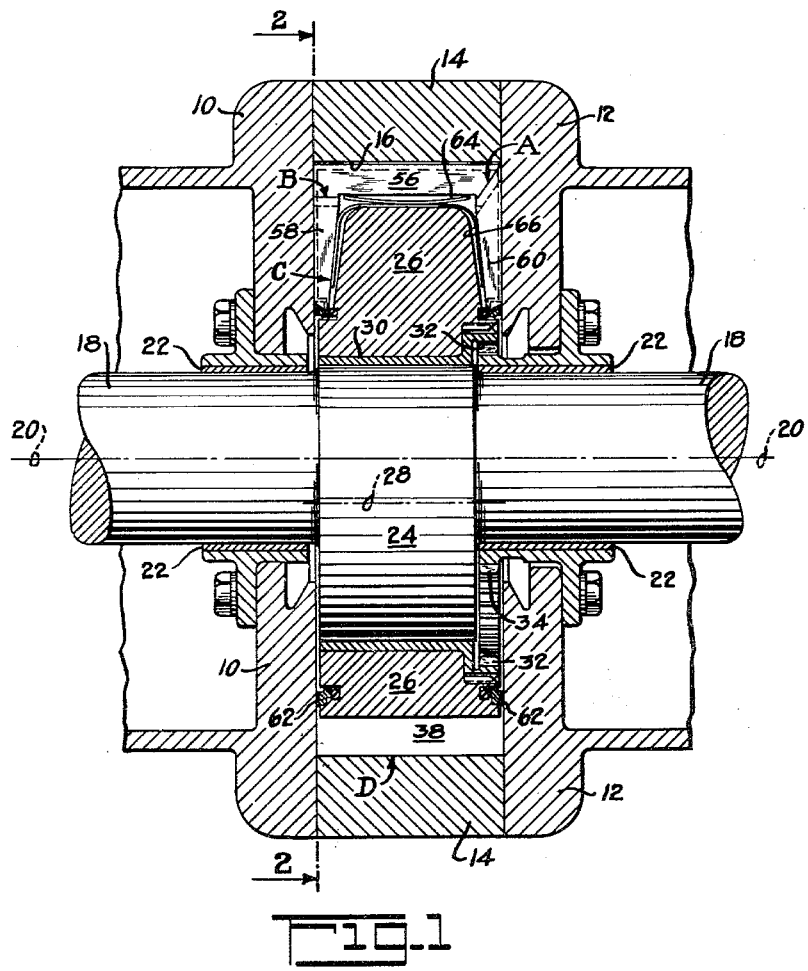
FIG. 1 is a diagrammatic, longitudinal, sectional view of a rotary engine embodying the invention, and as taken along line 1—1 of FIG. 2.

Referring to the drawings, a rotary combustion engine comprises spaced end walls 10 and 12, and a peripheral wall 14 disposed between and interconnecting said end walls to form a cavity therebetween. The inner surface 16 of the peripheral wall 14 preferably has a multi-lobed profile in cross-section which preferably is basically an epitrochoid.

A shaft 18 having an axis 20, which is co-axial with the axis of the outer body epitrochoidal cavity, extends through the outer body and is journaled in bearings 22 carried by the end walls 10 and 12. The shaft 18 has an eccentric portion 24 on which an inner body or rotor 26 is journaled. The common axis of the inner body 26 and the eccentric 24 is laterally spaced from the axis 20 and is indicated at 28.

The inner body 26 has a bearing 30 for rotationally supporting the inner body 26 on the shaft eccentric 24 and each end wall 10 or 12 has a bearing 22 in which the shaft 18 is journaled. These bearings 22 and 30 are preferably supplied with oil under pressure.

In order to maintain the relative motion of the inner body 26 relative to the stationary outer body an internal gear 32 is, as illustrated, secured to the inner body co-axially with the inner body axis 28 and is disposed in mesh with a fixed gear 34 secured to the outer body co-axial with the outer body axis 20.

The inner body 26 is received within the outer body cavity between its end walls 10 and 12 and has a plurality of circumferentially-spaced apex portions 36 about its outer periphery to form a plurality of working chambers 38 between the inner and outer bodies which vary in volume upon rotation of the inner body relative to the outer body.

The outer body has intake port means 40 for supply of an intake charge to the working chambers 38 and has exhaust port means 42 for discharge of exhaust gases from the engine. If needed, a suitable spark plug 44 may be provided to ignite the intake charge.

The inner body 26 has suitable apex seal means at each of said apex portions 36 which are in sealing engagement with the peripheral wall inner surface 16 and suitable end face seal means at each of its end faces 46 which are in sealing engagement with the end walls 10 and 12. Said apex seal means together with said end face seal means form a continuous seal about the working chambers 38.

The pressure differential between each two adjacent working chambers 38 urges the apex seal means therebetween laterally toward one side face or the other of its groove for sealing engagement therewith thereby leaving the slight clearance at the opposite side face of said groove. As a result, gas pressure from the adjacent working chamber 38 is transmitted through said clearance into the bottom of the associated groove whereby said pressure urges said apex seal means into sealing engagement with the outer body.

The engine so far described is substantially similar to the engine disclosed in the aforementioned United States Patent Number 2,988,065 and for additional description reference is made to said patent.

According to the invention, the rotor 26 has a U-shaped groove at each apex portion 36 with each groove being U-shaped in longitudinal section through the groove comprising a central portion 48 extending across its apex portion 36 from one end face 46 to the other and having two leg portions 50 and 52 one at each rotor end face and extending part-way radially inwardly along its end face, and a circular groove 54 in each rotor end face extending across the inner ends of the leg portions 50 or 52 of the U-shaped grooves. Each U-shaped groove receives a multi-part U-shaped seal seal strip means comprising a central portion 56, which is received within the central portion 48 of its associated U-shaped groove and is movable radially outwardly therefrom, and two leg portions 58 and 60 each of which is received in the corresponding leg portion 50 and 52 of its associated U-shaped groove and is movable axially outwardly from its rotor 26. Each circular groove 54 receives a ring seal 62, which extends across the inner ends of the adjacent leg portions 58 and 60 of the U-shaped seal strip means.

Each U-shaped apex groove also receives an apex spring means comprising a bowed piece 64, which urges the central portion 56 of the U-shaped apex strip means radialy outwardly in sealing engagement with the peripheral wall 14 and a U-shaped spring piece 66 with legs acting against the leg portions 58 and 60 of the apex seal strip means and urging them axially outwardly in sealing engagement with the adjacent housing end walls 10 and 12.

Each end face ring seal 62 has a rubber-like spring means 68 which is preferably an O-ring of rubber-like material. Such an O-ring is received in each end face groove 54 and helps the gas pressure to urge the ring seal 62 axially outwardly so that its axially outer face is in sealing engagement with the inner face of the adjacent end wall 10 or 12. Further, the rubber-like O-ring 68 bears against the axially inner face of the ring seal 62 and against the bottom of its groove 54 providing a seal therebetween so that leakage around the ring seal 62 is minimized.

The end face O-rings 68 and the apex springs 64 and 66 provide at least a portion of the pressure for good bearing and continuous contact of their respective end face seals 62 and apex seals 56, 58 and 60 against their adjacent walls 10, 12 and 14. After engine start-up, gas enters the bottom of their grooves from the working chambers 38 to help urge said seals outwardly.

Each circular end face ring seal 62 intersects each apex seal at the radially inner edge of the adjacent leg 58 or 60 of the apex seal. As illustrated in FIGS. 5 and 6, each said leg 58 or 60 has an extension portion which projects radially inwardly beyond the outer periphery of its adjacent ring seal 62 for engagement with a slot in a portion of said ring seal. Each said slot 72 and adjacent portion of the seal leg 58, 60 have means providing sealing cooperation therebetween and preventing leakage between adjacent working chambers 38.

The one piece end face ring seal 62 has an axially outer face which has a continuous groove 70 about midway between the radially inner and outer sides so that said face has two concentric surface rings bearing against the end wall. In this way, the seal cross-section has two legs each bearing separately against the end wall whereby tilting of the seal transversely to its groove 54 is minimized. The inner leg corner functions also to scrape the oil on the adjacent end wall 10 or 12 in a radially inward direction while rotating in its planetary path whereby oil leakage around the end face seal is controlled.

The one piece end face seal ring 62 provides gas sealing of the working chamber 38 on its radially outer side and oil sealing of the space between the rotor end face 46 and inner face of the wall 10 or 12 on its radially inner side. A lubricating oil film may adhere to the inner face of the end wall 10 or 12 over the surface of contact of the one-piece end face seal 62 as said seal slides in a planetary path scraping the oil radially inwardly. Such oil film minimizes the wear on the wall-engaging face of the one-piece seal 62 and of the surface of contact or wear path on the end wall 10 or 12, and improves the sealing of the working chambers 32.

The one-piece end face ring seal 62 is preferably located a distance radially inwardly from the peripheral edge of the rotor end face 46, and thereby is protected from the high temperatures and pressures of the combustion gases at the rotor periphery by the small gap between the rotor end face 46 and adjacent end wall 10 or 12.

The portions 48, 50 and 52 of each apex groove are preferably of equal width and the portions 56, 58 and 60 of its apex seal are of substantially equal thickness and slightly smaller than the width of said apex groove so that there is a substantially constant thickness gap for gas flow on one side of the apex seal. Hence, gas pressure acts uniformly over one side face of the apex seal and causes all portions 56, 58 and 60 to bear evenly against its groove sidewall.

As illustrated in FIG. 1, the legs 58 and 60 of the U-shaped apex seal are preferably tapered with the radially outer part of the leg being wider to match its central portion 56 and its radially inner part being narrower to match the end face seal 62.

As illustrated, each apex seal has two joints with one diagonal joint between the central portion 56 and one leg portion 60 of said apex seal, and with one axially parallel joint between said central portion 56 and the opposite leg portion 58 of said apex seal. Each such joint is shown as preferably being an interlocking or lap type, allowing separate movement of each side of the joint. With this construction, said U-shaped apex spring means 66, which contacts the inclined edges of said leg portions 58 and 60 of each said apex seal, urges one leg portion 60 axially for engaging its adjacent housing end wall 12 and also radially against the diagonal edge of said central portion 56, thereby urging said central portion 56 radially outwardly for engaging the peripheral wall 14 and axially for engaging the opposite end wall 10. Moreover, any unevenness in the inner surface 16 of the peripheral wall 14 or the inner faces of the end walls 10 or 12, which deflects its adjacent portion of the apex seal, does not disturb the sealing engagement of the remaining portions of the apex seal with their adjacent wall surfaces, whereby sealing is improved.

It is preferred if said diagonal joint at one end of said central portion 56 extends substantially to the radially outward corner of said apex seal. In this way, there is a continuous engagement around said corner between the outwardly facing edges of said apex seal and the inner surfaces of said housing walls 12, 14.

As the rotating ring seal 62 bears against its adjacent end wall 10 or 12, the stationary end wall normally causes a friction drag on the axially outward bearing face of said ring seal 62. In addition, acceleration forces normally act on each portion of each said ring seal 62 while its inner body 26 is rotating. For comparison, when such friction drag or acceleration forces also act similarly on the prior art form of end face seal, it may be tilted or separated at its numerous joints. However, with a one piece construction, the one piece end face ring seal 62 minimizes such tilting and separation, whereby sealing is improved.

With the aforementioned one-piece end face ring seal 62, not only does it provide the important combination of gas and oil sealing but it also replaces the need for two separate seals on each end face as used in the prior art form of rotor sealing so that each rotor working surface, that is, each rotor peripheral surface between a pair of adjacent apex portions 36, can be cut back compared to prior rotor construction. In this way, the recess, which is required in the center of the working surfaces with the prior art form of rotor and sealing, can also be eliminated. With the present invention however, each said rotor working surface is preferably made so that each said working surface has a straight line profile parallel to the rotor axis 28 in each plane including the rotor axis and each said surface has a substantial clearance from said outer body peripheral wall 14 while at its top dead center position.

A rotor 26 having working surfaces with the straight line profile of the present invention results in better combustion conditions, as well as providing a more uniform heat rejection rate to its outer body peripheral wall 14 from one axial end to the other of said wall, as compared to the prior art recessed type of rotor working surfaces. Thus, FIG. 9 illustrates in a partial longitudinal sectional view, a rotor 26 of the present invention and its adjacent peripheral wall 14, and schematically superimposed thereon is a curve 74 showing the heat rejection rate distribution to the peripheral wall in its combustion region, the magnitude of the heat rejection rate at each point across its peripheral wall being proportioned to the height of the curve 74 at said point. FIG. 10 is a similar view with the prior art rotor having gas seals 76 and oil seals 78 as described in United States Patent Number 3,033,180 and having recessed working surfaces, the recesses being indicated at 80, and with its corresponding heat rejection curve 82. As illustrated, the heat rejection curve 82 in FIG. 10 peaks midway between the ends of the peripheral wall, whereas in FIG. 9 its curve 74 is much flatter thereby indicating a more uniform heat rejection to the peripheral wall between its axially spaced ends.

The maximum heat rejection rate, as indicated by each arrow in the curves of FIGS. 9 and 10, determines the cooling requirements and thus, the maximum power of an engine. This limitation is particularly important if air cooling is employed. For the same air cooling capacity or effort, the engine as per FIG. 9 can consequently produce more useful output than the prior art engine as per FIG. 10.

A still more uniform heat rejection distribution to the peripheral wall 14 may be provided by adding a radially outwardly projecting ridge 86 to each rotor working face as shown in FIGS. 11 and 12. As best seen in FIG. 12 each ridge 86 of a rotor working surface is disposed substantially midway between and parallel to the axially spaced ends of the rotor thus being at the center of the working chamber 38 with each ridge terminating short of the apex portions 36 at the ends of said surface. With this construction at least the intermediate portion of each rotor working surface has a hat-shaped profile in planes including the rotor axis. Except for the ridge 86 the rotor of FIGS. 11 and 12 is substantially identical to FIG. 9 except for an adjustment in the rotor surface to provide for the compression ratio design, and therefore may have the sealing arrangement illustrated in FIGS. 1-8. An effect of the rotor center ridge 86 is to spread the combustion from the center of the chamber 38 towards both axial end portions of said combustion chamber. FIG. 11 also illustrates a heat rejection rate curve 84 with an arrow indicating its maximum heat rejection rate for this form of rotor corresponding to the curves 74 and 82 of FIGS. 9 and 10. As shown, the heat rejection to the peripheral wall 14 of FIG. 11 is even more uniform than that of FIG. 9 and FIG. 10. Thus, the engine of FIG. 11, based on the same cooling configuration, can be designed for a higher power output than the engines of FIG. 9 and FIG. 10.

Figure 2:
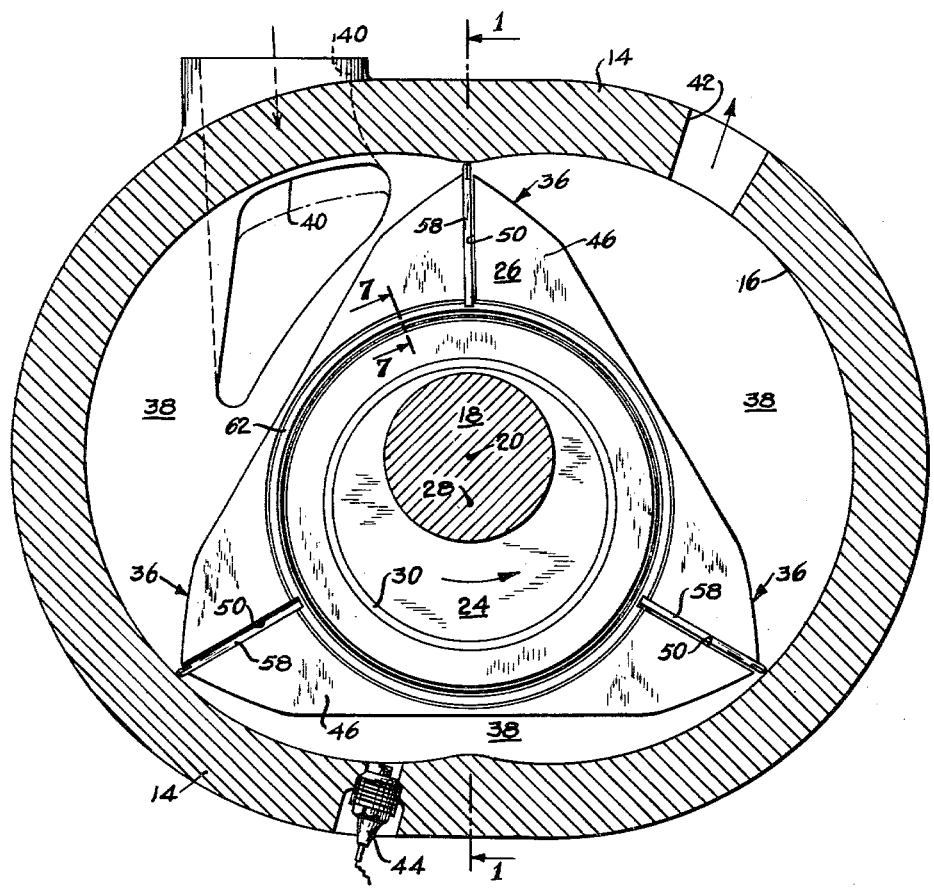
FIG. 2 is a sectional view taken along line 2—2 of FIG. 1.

In the case of an engine having an intake port 40 in one or both end walls of the outer body, the rotor and seal structure of the present invention (FIGS. 1–9) has a further advantage over a prior art rotor (FIG. 10) and its seal structure (Patent Number 3,033,180), in that the intake port can be made to open earlier. This is because of the improved combustion chamber shape (FIGS. 9 and 11) and also the improved end face seals (FIGS. 1–9) of this invention. The rotor working surfaces (FIG. 9), or at least their axial ends (FIG. 11), are cut back compared to the prior art rotor (FIG. 10) providing an improved combustion chamber shape whereby the intake port is uncovered earlier. Also with the sealing structure of this invention in an engine having an end wall intake port in one, or both end walls of the outer body, the outer edge of the intake port 40 may be disposed quite close to the peripheral wall, whereas in the prior art rotor (FIG. 10) and seal structure (Patent 3,033,180), the outer edge of its intake port has to be disposed a substantial distance inwardly, for example as indicated in FIG. 2 by the dot and dashed line, to provide a continuous end wall surface and smooth sliding surface for the intermediate end seal pins at each apex of the prior art type of rotor and seal. This outward displacement of the intake port edge also can be used to provide earlier intake port opening as compared to said prior art, and also results in a larger intake port and therefore a more efficient induction system. With four-stroke engines, it is known that it is better to open the intake port before the top dead center position. In the prior rotary engines, the side intake ports cannot be opened until after top dead center position because of the rotor and sealing arrangement. With this invention in the prior rotary engine, its side intake ports can open even before top dead center position whereby the volumetric efficiency and performance of said engine is improved.

If desired, instead of the arrangement as shown in FIG. 6 in which the radially inner ends of each apex seal leg portion 58, 60 is received in a slot 72 in the adjacent ring seal 62, the arrangement as shown in FIGS. 13 and 14, in which the parts corresponding to the parts of FIGS. 1–12 have been designated by the same reference numerals but with a subscript "a" added thereto, may be provided in which a sealing pin element 88 is disposed between the radially inner end of each apex seal leg portion 58a or 60a and the adjacent portion of the end face ring seal 62a. A groove is provided in the adjacent portion of said ring seal 62a receiving and sealingly engaging said pin element 88.

The pin element 88 has a slot in its radially outer side receiving said radially inner end of said apex seal leg portion 58a or 60a for sealing engagement therebetween, preferably between a side face of said radially inner end and a sidewall of said slot in the pin element 88.

If desired, said construction joints at each end of the central portion 56 of each apex seal may be an abutting type of joint, instead of a lapping type as illustrated in FIGS. 1–8. Further, said apex seal may also have a single diagonal joint at one end only of said central portion 56, thus forming a two-piece seal with one of said pieces having an L-shape, or said apex seal may have two diagonal joints as still another form of embodiment, instead of the single diagonal joint and single axially parallel joint as embodied in FIGS. 1–8.

While I have described my invention in detail in its present preferred embodiment it will be obvious to those skilled in the art after understanding my invention that various changes and modifications may be made therein without departing from the spirit or scope thereof. It is intended by the apended claims to cover all such modifications.

What is claimed is:

1. A combination rotor and sealing structure for use in a rotary mechanism having an outer body with axially spaced end walls and a peripheral wall interconnecting the end walls to form a cavity therebetween for receiving said rotor structure for rotation about an axis eccentric to the outer body axis; said rotor and sealing structure comprising a rotor having axially spaced end faces and a peripheral surface having a plurality of circumferentially-spaced apex portions for forming a plurality of working chambers between the rotor and outer body; said rotor also having a groove at each apex portion with each said groove comprising a central portion extending longitudinally across its apex portion from one end face to the other and having two leg portions, one at each rotor end face and extending part-way radially inwardly along its end face, said groove being U-shaped when viewed in longitudinal section, and a circular groove in each rotor end face extending across the inner ends of the leg portions of the U-shaped grooves; a multi-part U-shaped seal strip means received in each of the U-shaped grooves, each U-shaped seal strip means including a central portion received within the central portion of its associated U-shaped groove and movable radially outwardly therefrom and two leg portions received within the leg portions of its associated U-shaped groove and movable axially outwardly from its rotor; and a one piece ring seal received within its circular groove in each rotor end face; said ring seal and said apex seal leg portions including means providing sealing cooperation between the inner ends of said leg portion and the ring seal; and a rubber-like spring means received within each said circular groove between the associated ring seal and an adjacent wall of the groove to provide a seal therebetween; each said rotor peripheral surface between adjacent apex portions having a substantial clearance from said outer body peripheral wall while at its top dead center position at least at the portions of said peripheral surface adjacent to said rotor end faces.

2. A combination rotor and sealing structure as claimed in claim 1 and in which each said rotor peripheral surface between adjacent apex portions has a straight line profile in each plane including the rotor axis.

3. A combination rotor and sealing structure as claimed in claim 1 and in which each said rotor peripheral surface between adjacent apex portions has a single ridge disposed substantially midway between said rotor end faces and extending radially outwardly such that at least the intermediate portion of each said surface has a hat-shaped profile in planes including the rotor axis.

4. A combination rotor and sealing structure as claimed in claim 1 and in which each said rubber-like spring means engages the axially inner side of its ring seal for urging said ring seal axially outwardly.

5. A combination rotor and sealing structure as claimed in claim 1 and in which each said U-shaped groove at each said apex portion has spring means urging the central portion of its U-shaped seal strip means radially outwardly and urging each of its leg portions axially outwardly.

6. A combination rotor and sealing structure as claimed in claim 1 and in which each said apex seal has a juncture between its central portion and one of its leg portions extending radially inwardly and axially inwardly from an adjacent radially outer corner of said apex seal.

7. A combination rotor and sealing structure as claimed in claim 1 and in which said means providing sealing cooperation between the inner ends of said apex seal leg portions and said ring seal comprise a pin element disposed between each said leg portion and said ring seal.

8. A combination rotor and sealing structure as claimed in claim 7 and in which each said pin element has a groove for receiving said leg portion and said ring seal has a groove for receiving said pin element.

9. A rotor for use in a rotary mechanism having an outer body with axially spaced end walls and a peripheral wall interconnecting the end walls to form a cavity therebetween for receiving the rotor for rotation about an axis eccentric to the outer body axis; said rotor having a plurality of circumferentially-spaced apex portions so that the portions of the peripheral surface of the rotor between adjacent apex portions of the rotor form working surfaces of the rotor, each rotor working surface having an outwardly projectly ridge running along said surface substantially midway between and parallel to the axially spaced ends of the rotor so that at least the intermediate portion of each working surface between its adjacent apex portion has a hat-shaped profile in planes including the rotor axis.

References Cited by the Examiner

UNITED STATES PATENTS

| | | | |
|---|---|---|---|
| 694,763 | 3/02 | Liethegener et al. | 123—8 |
| 695,006 | 3/02 | Stowell | 123—8 |
| 880,009 | 2/08 | Burton | 123—8 |
| 3,127,095 | 3/64 | Froede | 230—145 |
| 3,127,096 | 3/64 | Froede | 123—8 |
| 3,130,900 | 4/64 | Schlor | 230—145 |

FOREIGN PATENTS 1,217,056  12/59  France.
1,145,432  3/63   Germany.

JOSEPH H. BRANSON, Jr., *Primary Examiner.*

WILBUR J. GOODLIN, *Examiner.*